United States Patent
Pickering

(10) Patent No.: US 6,496,799 B1
(45) Date of Patent: Dec. 17, 2002

(54) END-OF-UTTERANCE DETERMINATION FOR VOICE PROCESSING

(75) Inventor: John Brian Pickering, Winchester (GB)

(73) Assignee: International Business Machines Corporation, Armonk, NY (US)

(*) Notice: Subject to any disclaimer, the term of this patent is extended or adjusted under 35 U.S.C. 154(b) by 210 days.

(21) Appl. No.: 09/592,798

(22) Filed: Jun. 13, 2000

(30) Foreign Application Priority Data

Dec. 22, 1999 (GB) ............................................. 9930731

(51) Int. Cl.⁷ .......................... G01L 15/26; G01L 15/04
(52) U.S. Cl. ...................................... 704/235; 704/253
(58) Field of Search ................................ 704/235, 251, 704/257, 249, 250, 260, 253

(56) References Cited

U.S. PATENT DOCUMENTS

| | | | | |
|---|---|---|---|---|
| 4,692,941 A | * | 9/1987 | Jacks et al. | 704/260 |
| 5,396,542 A | * | 3/1995 | Alger et al. | 704/251 |
| 5,414,755 A | * | 5/1995 | Bahler et al. | 704/249 |
| 5,761,637 A | * | 6/1998 | Chino | 704/251 |
| 5,960,395 A | * | 9/1999 | Tzirkel-Hancock | 704/257 |
| 6,175,820 B1 | * | 1/2001 | Dietz | 704/235 |
| 6,208,971 B1 | * | 3/2001 | Bellegarda et al. | 704/251 |

FOREIGN PATENT DOCUMENTS

| | | | | |
|---|---|---|---|---|
| GB | 2280820 | 2/1995 | | H04M/3/50 |
| WO | WO96/25733 | 8/1996 | | G10L/3/00 |

* cited by examiner

*Primary Examiner*—Richemond Dorvil
*Assistant Examiner*—Daniel A. Nolan
(74) *Attorney, Agent, or Firm*—A. Bruce Clay

(57) ABSTRACT

A voice processing system receives spoken input from a user, which is subjected to speech recognition to convert the spoken input into a text equivalent. The semantic and/or prosodic properties of the spoken input are then analysed, and based on the results of this analysis, it is determined whether or not the user input has effectively completed. Thus for example if a semantic analysis indicates that the user is no longer saying anything useful, then the system may decide to interrupt the user and play a further prompt to him or her, clarifying what extra input is required.

24 Claims, 4 Drawing Sheets

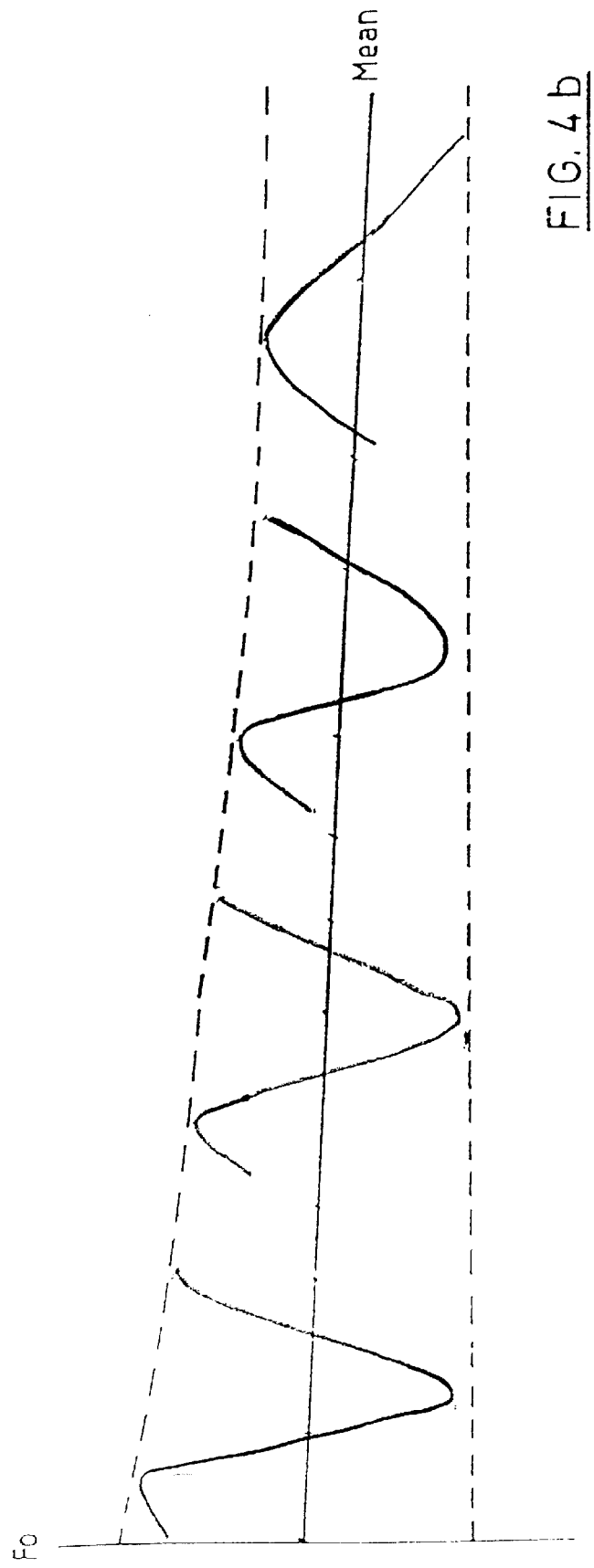

END-OF-UTTERANCE DETERMINATION FOR VOICE PROCESSING

BACKGROUND OF THE INVENTION

1. The Present Invention

The present invention relates to voice processing apparatus and the like, and more particularly to voice processing systems that use speech recognition.

2. Description of the Related Art

Voice processing systems whereby callers interact over a telephone network (e.g. PSTN or Internet) with computerised equipment are very well-known in the art, and include voice mail systems, voice response units, and so on. Typically such systems ask a caller questions using prompts formed from one or more prerecorded audio segments, and the caller inputs answers by pressing dual tone multiple frequency (DTMF) keys on their telephones. This approach has proved effective for simple interactions, but is clearly restricted in scope due to the limited number of available keys on a telephone. For example, alphabetical input is particularly difficult using DTMF keys.

There has therefore been an increasing tendency in recent years for voice processing systems to use speech recognition in order to augment DTMF input (N.B. the term speech recognition are denote the act of converting a spoken audio signal into text). The utilisation of speech recognition permits the handling of callers who do not have a DTMF phone, and also the acquisition of more complex information beyond simple numerals from the caller.

As an illustration of the above, WO96/25733 describes a voice response system which includes a prompt unit, a Voice Activity Detector (VAD), and a speech recognition unit. In this system, as a prompt is played to the caller, any input from the caller is passed to the VAD, together with the output from the prompt unit. This allows the VAD to perform echo cancellation on the incoming signal. Then, in response to the detection of voice by the VAD, the prompt is discontinued, and the caller input is switched to the recognition unit, thereby providing a barge-in facility.

Speech recognition in a telephony environment can be supported by a variety of hardware architectures. Many voice processing systems include a special DSP card for running speech recognition software. This card is connected to a line interface unit for the transfer of telephony data by a time division multiplex (TDM) bus. Most commercial voice processing systems, more particularly their line interface units and DSP cards, conform to one of two standard architectures: either the Signal Computing System Architecture (SCSA), or the Multi-vendor Integration Protocol (MVIP). A somewhat different configuration is described in GB 2280820, in which a voice processing system is connected via a local area network to a remote server, which provides a speech recognition facility. This approach is somewhat more complex than the TDM approach, given the data communication and management required, but does offer significantly increased flexibility.

Speech recognition systems are generally used in telephony environments as cost-effective substitutes for human agents, and are adequate for performing simple, routine tasks. It is important that such tasks be performed accurately, otherwise there may be significant caller dissatisfaction, and also as quickly as possible, both to improve caller throughput, and because the owner of the voice processing system is often paying for the call via some free phone mechanism (e.g. an 0800 number), or because an outbound application is involved.

(Note that as used herein, the term "caller" simply indicates the party at the opposite end of a telephone connection to the voice processing system, rather than to specify which party actually initiated the telephone connection).

There has been an increase in recent years in the complexity of input permitted from the caller. This is supported firstly by the use of large vocabulary recognition systems, and secondly by supporting natural language understanding and dialogue management. As a simple example of this, a pizza ordering application several years ago might have gone through a menu to determine the desired pizza size, topping etc., with one prompt to elicit each property of the pizza from a caller. Now however, such an application may simply ask: "What type of pizza would you like". The caller response is passed to a large vocabulary continuous speech recognition unit, with the recognised text then being processed in order to extract the relevant information describing the pizza.

The extraction of such information is typically performed by a natural language understanding (NLU) unit working in conjunction with a dialogue manager. These units have knowledge of grammar and syntax, which allows them to parse a caller response such as "I would like a large pizza with pepperoni" to extract the particular information desired by the application, namely that the desired pizza (a) is large, and (b) has a pepperoni topping. The dialogue manager further provides flexibility in terms of generating prompts (perhaps using text-to-speech synthesis) to acquire specific information from a caller.

The above approach presents a much more natural interface for callers, provides greater flexibility, and potentially can significantly reduce call handling time. However, the increased flexibility also increases the scope for caller confusion. In such cases call efficiency can actually be reduced, and a lost call may result. Prior art voice processing systems have not addressed the problem of caller confusion or uncertainty that is sometimes an inevitable consequence of trying to support a caller interface that is more natural, but at the same time also more complex.

SUMMARY OF THE INVENTION

Accordingly, the invention provides a method of operating a voice processing system comprising the steps of:

receiving spoken input from a user;

performing speech recognition to convert said spoken input into text equivalent;

analysing at least one semantic or prosodic property of said spoken input by looking for task words in the text equivalent of the spoken input; and responsive to said analysis, determining that the user input has effectively completed if there has not been a task word for more than a predetermined period of time.

The invention typically finds application in a telephony environment, in which the voice processing system and the user communicate with each other over a telephone network. In this situation, the spoken input is received over a telephone connection, and the voice processing system may itself play out prompts over the telephone connection, such as in response to a determination that the caller input has effectively been completed. The particular prompt played back to the caller in these circumstances may of course be dependent on what information the caller has so far provided to the voice processing system.

Underlying the present invention is the fact that conventional human dialogue is regulated by the concept of turntaking, with linguistic cues that indicate when one party has finished speaking, and is expecting or inviting the other party to take over. Prior art voice processing systems have not been sensitive to such cues, and so seem extremely artificial in terms of the dialogue that they support. This in turn can cause difficulties for callers trying to use such systems, particularly if they have relatively little experience with such man-machine interfaces.

Unlike prior art systems, the present invention allows a determination of when the caller input has effectively (rather than actually) been completed. In other words, it detects not when the caller has stopped speaking altogether, but rather when the caller has stopped saying anything useful or relevant. This is achieved by analysing at least one semantic or prosodic property of said spoken input. The intention is firstly to assist more quickly callers who are in difficulty (whether or not they are conscious of the fact), and secondly to speed up call handling by interrupting callers who are giving lots of irrelevant information. The naturalness of the caller interface can also be improved by this approach, since the techniques employed mirror to a certain extent what happens in normal conversation.

Since playing out a prompt before the caller has stopped speaking altogether effectively represents an interruption of the user, it must be timed so as to minimise any confusion or indeed offense to the user. Thus if the system starts its prompt at a particular moment when the user is still talking, the user is likely to miss the start of the system prompt. Therefore, in the preferred embodiment, once it has been determined that the user input is effectively completed, the system then plays out the next prompt when there is some break in the spoken input. This ensures that the user is likely to hear all of the system prompt, and reinforces the naturalness of the dialogue.

Note that typically the duration of a break to trigger the interruption will be much shorter than the time-out period for user input into conventional voice processing systems. Thus such prior art systems rely on silence to determine completion of user input, and so need a relatively long time-out period to discriminate input completion from the short, transitory breaks which are natural in any spoken input due to breathing, etc. By contrast, in the present invention, the determination of effective caller completion is made from semantic and/or prosodic properties, thereby allowing a much shorter interval to then be used to trigger the interruption.

This clearly has advantages even when the user does not in fact intend to continue after the break, in that the quicker determination of caller completion both accelerates call handling, and also prevents an artificially long period of silence intruding upon the dialogue.

Other possible cues for an interruption by the voice processing system (which would typically be employed in addition to the use of a break) include when the caller is dwelling on an extra-linguistic word, such as "um". Such an approach does however require a fast response from the speech recognition system to be effective, and so would be more difficult to use as a trigger than a break, which can be detected very quickly by the voice processing interface software.

There are a wide variety of techniques available for the step of analysing at least one semantic or prosodic property of said spoken input. These can be used either singly, or in conjunction with one another. One possibility based on semantics is to look for task words in the text equivalent of the spoken input. In this case the determination can be made that the user input has effectively completed when the caller has not spoken any task word within a last predetermined period of time, or according to any other suitable criteria to indicate a reduction or termination in useful information from the caller.

Another possibility, based this time on prosody, is to look for a prolonged pitch fall as representing effective completion of the spoken input. Such a combination of increased duration and falling pitch is a good indication in normal conversation that the speaker has completed their contribution. A further possibility is to look for a reset of the pitch excursion envelope; this typically indicates that the caller is psychologically re-starting their input, which in turn suggests that he or she has become confused.

Since the prosodic indicators are independent of the textual equivalent of the caller input, they can be calculated in parallel with the speech recognition. However, since such prosodic indicators may not be completely reliable by themselves, in the preferred embodiment they are used in conjunction with semantic properties. As an example of this, one good indication that the caller has effectively completed is that the caller is asking the machine a question. This can be detected both semantically, in terms of word order or words such as "how" etc., and also prosodically, typically by virtue of a final rise in caller pitch.

The invention further provides a voice processing apparatus comprising:

an input device to receive spoken input from a user;

a speech recognition unit to convert said spoken input into text equivalent; and means for analysing at least one semantic or prosodic property of said spoken input, wherein responsive to said analysis, it is determined that the user input has effectively completed.

Such voice processing apparatus may be adapted for connection to the telephone network (conventional PSTN or the Internet), in a customer server kiosk, or in any other appropriate device. Note that the speech recognition means and/or any natural language understanding may or may not be integral to the voice processing system itself (as will be apparent more clearly from the preferred embodiments described below).

The invention further provides a computer readable medium containing instructions readable by a computer system operating as a voice processing system, said instructions including instructions for causing the computer system to perform the following steps:

receiving spoken input from a user;

performing speech recognition to convert said spoken input into text equivalent;

analysing at least one semantic or prosodic property of said spoken input;

and responsive to said analysis, determining that the user input has effectively completed.

The computer readable medium may comprise a magnetic or optical disk, solid state memory device, tape, or other appropriate storage apparatus. In some cases this medium may be physically loadable into the storage device. In other cases, this medium may be fixed in the voice processing system, and the instructions loaded onto the medium via some wired or wireless network connection. Another possibility is for the medium to be remote from the voice processing system itself, with the instructions being downloaded over a wired or wireless network connection for execution by the voice processing system.

It will be appreciated that the computer program and apparatus of the invention will benefit from substantially the same preferred features as the method of the invention.

BRIEF DESCRIPTION OF THE DRAWINGS

An embodiment of the invention will now be described in detail by way of example only with reference to the following drawings:

FIGS. 4a and 4b provide schematic representations of pitch movement during a spoken phrase.

DETAILED DESCRIPTION

Figure 1:
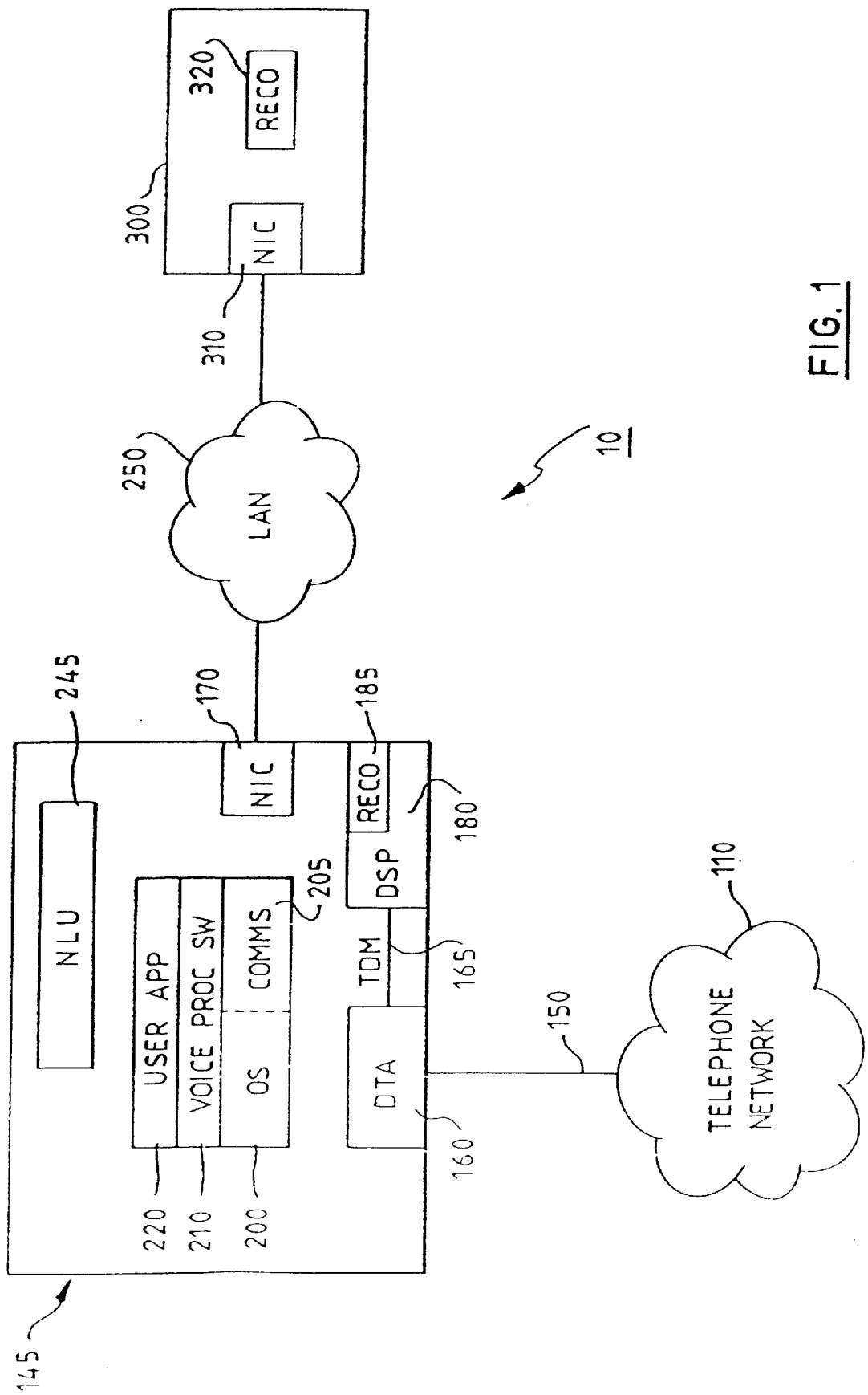
FIG. 1 is a simplified schematic diagram of a voice processing system connected to a remote server.

FIG. 1 illustrates in simplified schematic form the main hardware and software components of a voice processing system 10 having speech recognition functionality. The system 10 is connected to the telephone network 110 by one or more telephony channels 150. In FIG. 1 these are digital trunk lines, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX; indeed one possibility is for the voice processing system to be a part of the telephone network itself, providing intelligent services to the network.

The system unit 145 of the voice processing system comprises a computer workstation, which runs an appropriate operating system 200 and a voice processing program 210, which in turn interacts with a user application 220 in order to determine how calls should be processed. The voice processing platform also supports a natural language understanding (NLU) unit 245 which includes dialogue management. The system unit includes one or more digital trunk adapter cards 160 for interfacing to the telephone network 110 via link 150. The system unit also contains a network interface card 170 which allows programs running on the workstation to communicate over a local area network (LAN) 250, using communications software 205 incorporated into the operating system. In addition, the system unit includes a digital signal processing (DSP) card 180, which is connected to the trunk adapter (or adapters) via a time division multiplex (TDM) bus 165. Speech recognition software 185 may be installed as microcode or firmware on the DSP card.

The adapter cards 160 are responsible for interfacing with the telephone network over their respective lines, including signalling, demultiplexing incoming telephony signals, and so on. They may also be used to perform activities such as voice activity detection on a particular telephony channel, compression/decompression of voice signals, and DTMF recognition and generation, although these may be performed on the DSP card instead.

A server system 300 is attached to the LAN 250 via network interface card 310, and supports an operating system and appropriate communications software (not shown), and speech recognition software 320. It will be appreciated therefore that there are two speech recognition resources available to the application 220, the first of these being locally installed on the DSP card 180 in the system unit, and the second speech recognition resource being available remotely via the LAN 250 on server 300.

The voice processing system includes storage (not shown), either as part of system unit 145 or accessible remotely over LAN 250 for storing software such as voice processing program 210, along with ancillary data and prerecorded audio segments for use by application 220. This software can then be loaded and run as required on one or more processors (not shown) in system unit 145.

In one preferred embodiment, the voice processing system is the IBM VOICE RESPONSE system (previously known as the IBM DIRECTTALK voice processing system) available from the IBM Corporation, running on an IBM RS/6000 workstation on top of the IBM AIX operating system. The speech recognition resource comprises a large vocabulary speech recognition system and may, for example, be the IBM VIAVOICE speech recognition engine, available from IBM Corporation. PC-based systems are also available. Likewise, the NLU unit with dialogue management may also be provided by the IBM VIAVOICE product.

It will be appreciated that there are many possible variations in the design of the voice processing system of FIG. 1. For example, some voice processing systems accept input from analog lines rather than digital trunks, whilst other voice processing systems are connected to the Internet instead of, or as well as, the conventional telephone network (this provides Voice over IP capability). Some voice processing systems may package the DSP card 185 as a daughter card of the digital trunk adapter 160, thereby eliminating the need for the TDM bus. In addition, the illustrated system has access both to a server speech recognition system, and also to a local DSP recognition system, whereas many voice processing systems will have access to only one such resource. Other voice processing systems may also support text to speech (TTS) as an output mechanism, typically enabled by software running on DSP card 185, although again this may be provided remotely by a server over the LAN. Further, any suitable network could be used for communications between the server and the voice processing system, providing it has suitable transmission characteristics in terms of bandwidth and latency (e.g. one possibility might be to use an ATM connection). Additionally, although the voice processing system illustrated has just a single local DSP resource, some voice processing systems may include multiple DSP cards, with each card supporting multiple recognition programs running simultaneously (or possibly different applications such as TTS). Moreover, although the server approach as shown has the recognition system installed on a separate machine from the line interface unit 160, it would clearly be possible for the software recognition system to be running on the same machine 145 as the line interface unit, provided this machine had sufficient processing capability. Conversely, the NLU unit could run on a separate system from system unit 145, for example, on system 300, or possibly on some other system (not shown) connected to LAN 250.

The recognition system and/or the NLU unit may not be included per se in the voice processing system of the invention, but rather may be supplied by some external componentry. Alternatively, the recognition system and/or the NLU unit may be part of or integral to the voice processing system. The NLU unit may be included as part of the user application 220 or as part of the voice processing program 210. The skilled person will appreciate that such variations are not pertinent to the principles of the present invention.

A typical operation of the voice processing system of FIG. 1 is as follows. An incoming call is received over the telephony network 110, and the voice processing system 10, under the control of the user application 220, may determine that the caller does not have a DTMF telephone (this determination can be made for example through knowledge of the calling or called number, or by the caller failing to depress a tone key when requested to do so). Alternatively, the machine may be configured to use speech recognition for all callers. In any event, the voice processing system proceeds to utilise voice recognition to interpret the caller's input, which is generally received in response to an outgoing prompt from the voice processing system. The caller input is forwarded to a speech recognition resource. For use of the local resource, this leads to a channel on the trunk adapter 160 being connected with a channel on the DSP card 180 via the TDM bus 165. Access to the remote resource can be achieved for example using the approach described in GB 2325110, which is incorporated herein by reference. (Note that the TDM bus connection as shown in FIG. 1 provides a uni-directional data flow, so that as is well-known in the art, a pair of such connections are needed to support a full duplex telephone conversation).

The speech recognition system processes the received audio signal, and returns the spoken string to the user application 220. It will be noted that the large majority of voice recognition systems used in telephony are speaker independent; in other words, such systems are trained to recognise vocal input from any speaker. This is accomplished by training the machine on vocal samples from a representative set of speakers. The recognition unit also returns other information in addition to the recognised string, in particular the statistical confidence level. Additional data may also be returned, such as possible alternative results and so on. Where appropriate, this text is first analysed by the NLU unit 245 to extract relevant meaning, before being supplied to the user application. This then leads to further processing of the call in accordance with the determined caller input. For example, if the caller has spoken a numerical sequence corresponding to an account number, it may provide the caller with the ability to access account information; if the caller has spoken a particular name, it may transfer the caller to the telephone extension for that name. Another possibility is to continue the caller dialogue by playing further prompts to the caller. The dialogue management facility in NLU unit 245 allows such prompts to be constructed on the fly to reflect the caller input.

Figure 2:
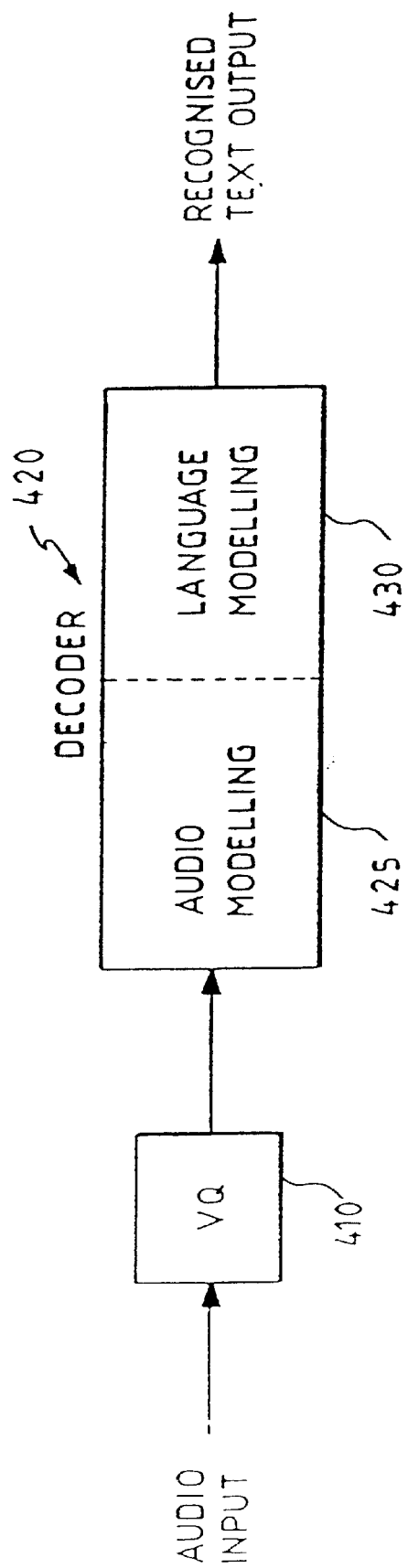
FIG. 2 is a simplified schematic diagram of a speech recognition system for use in or with the voice processing system of FIG. 1.

FIG. 2 illustrates a simple schematic diagram of a typical speech recognition system such as might be used in the voice processing system of FIG. 1. Thus the recognition system receives digitised audio input, which in the case of a telephone signal will generally comprise 8 bit samples at 8 kHz (corresponding to a total data rate of 64 kbit/s). These samples are passed to a vector quantisation unit 410, which aggregates them into vectors of typically 10 ms duration (i.e. 80 samples per vector). The vector quantisation unit may be supplied with a so-called alphabet of vectors (known as labels), and replaces each input vector with the label which matches it most closely. Typically there may be about 200 such labels in the vector quantisation alphabet. (N.B. Some recognition systems do not in fact perform any vector quantisation, but work with a parameterisation of the raw input vectors rather than a limited set of labels).

The audio input, now represented as a sequence of vector labels (or parameters), is then passed into a decoder unit 420, which is responsible for converting this sequence into recognised text. The decoder functionality can be broken down into two main components, audio modelling 425, and language modelling 430. The purpose of the audio modeller is to produce a variety of candidate word strings which may match the input sequence of vector labels; the purpose of the language modeller is then to select which of these word strings is the overall best fit to the audio input.

A language modeller typically looks at the likelihood of particular words appearing next to one another in spoken text, which can be used amongst other things to help decide between homophones (different words sounding the same); "new car" is in general much more likely than "knew car". Note that in a telephony environment, language modelling is often simpler because the speaker is constrained to a particular subject matter (such as pizza ordering).

Figure 3:
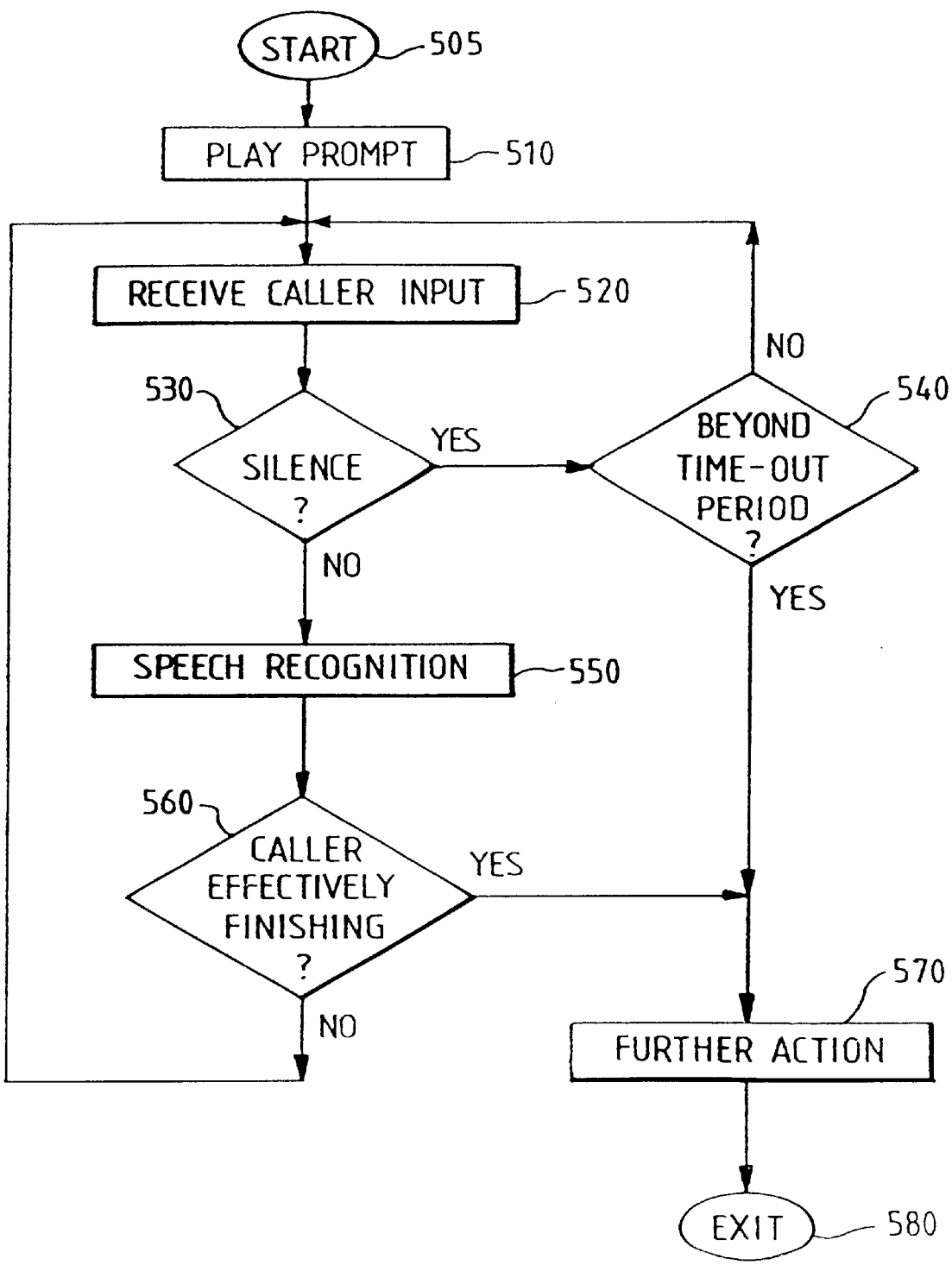
FIG. 3 is a schematic flow chart illustrating the method of operation of the system of FIG. 1 in a preferred embodiment of the invention.

FIG. 3 illustrates a preferred method in accordance with the present invention, such as may be implemented using the voice processing system of FIG. 1. The method starts (505) and proceeds to play a prompt to the caller (step 510); it will be appreciated that this activity may commence at some point during a call (i.e. there may have been previous prompts or other actions on the call). The input from the telephone connection is then received (step 520) in conventional fashion, and a test made to see whether or not the input is silence (step 530). If this is the case, the system then checks whether the amount of silence exceeds a predetermined time-out period (step 540)—if so, the method proceeds to step 570, which will be discussed in more detail later, and then onto the exit (step 580). (It will be noted here that this further action may be dependent on what has happened previously, for example, whether the method has arrived at step 570 via step 540 or via step 560). If on the other hand, the time-out period has not been exceeded, the method returns to processing additional input (step 520).

It will be appreciated that the time-out period used in the test of step 540 may depend for example on whether or not the caller has said anything. Thus a relatively long delay may be more acceptable at the beginning of the caller response period, in order to allow the caller to be satisfied that the outgoing prompt has terminated, and possibly to gather any information needed for the reply.

Returning now to step 530, if this test is negative, it is assumed that the caller has said something, which is passed for speech recognition (step 550). Note that commercially available real-time recognition systems return results on a word by word basis as the caller continues his/her input. The speech recognition is followed by a test at step 560 to determine whether or not the caller has effectively finished his/her input. This test is discussed in more detail below, but is based on something other than the caller simply going quiet (which would already have been detected at step 530). If the caller has finished, the method proceeds to take further action (step 570) and exit (step 580), otherwise it loops back for more caller input (step 520).

Before discussing steps 560 and 570 in more detail, it will be noted that the method of FIG. 3 is subject to many variations. For example, some voice processing applications may ask the caller to terminate their input by pressing a particular DTMF key. This would then result in the test of step 530 becoming effectively tri-partite, looking for silence, DTMF key, or caller input. The result of the caller entering a DTMF key would typically be for the system to go direct to the further action (step 570), unless the system was expecting more than one DTMF key to be entered (in which case it would loop back to step 520).

Also, there may be additional error processing steps, for example if the speech recognition of step 550 fails to produce any text, perhaps because the audio quality of the line is poor. In this case, the method will typically return back to step 510, or may take some other action, such as transferring the caller to a human operator.

Focusing now on step 560, the purpose of this test is to determine when the caller has finished saying anything useful, as opposed to step 540, which determines when the caller has finished saying anything at all. This typically occurs when the caller is confused by the prompt, and/or does not know or has forgotten what information he/she is supposed to provide. The principle here is then to proceed to step 570, which can effectively interrupt the caller with a new prompt, perhaps specifically indicating information which remains outstanding, or can take some other action, such as transferring the caller to a human agent.

There are a variety of tests which can be utilised in step 560, either individually, or in a combination of two or more tests. Suitable tests fall into two general categories, which can loosely be regarded as semantic and prosodic. Semantic tests look at the words that the caller is speaking, and in particular for certain predetermined task words (N.B. the set of task words may vary from one prompt to another). Thus consider for example an interactive voice response (IVR) application in a sports shop, which firstly asks callers "Please state which sport you are interested in". The task words here might be names of various sports. Thus if the caller answered "I'm interested in football", the speech recognition unit transcribes this input, and the NLU unit extracts "football" as the task word. If on the other hand, the caller starts "I'm not sure really, I want to buy something for my son, he's seven years old . . . ", the NLU unit fails to find any task words.

In one embodiment, the test of step 560 therefore monitors how long it has been since the caller said something useful (i.e. a task word). If this exceeds a predetermined time limit, perhaps 10 seconds, then the caller is regarded as effectively having finished, and the method proceeds to step 570.

Another possible element of the test in step 560 is to monitor the rate of extra-linguistic utterances from the caller, such as "Um", "Er" etc (providing these are transcribed by the speech recognition unit). The base rate of these will of course vary from one speaker to another, but a sudden increase in the ratio of these extra-linguistic utterances to dictionary words for any given caller is another useful indicator that the caller has run out of anything useful to say.

A further possible criterion in step 560 is to determine whether the caller input grammatically represents a question. For example, if a caller says "Is that OK", or "Do you need anything more", then clearly it is now time for the IVR to take over responsibility for the dialogue.

The other class of test that can be used in step 560 can be regarded as prosodic, in other words, based not on the actual words of the caller input, but on other aspects such as intonation, etc. It will be appreciated that since such prosodic tests do not require knowledge of the text of the caller input, they can run in parallel to the speech recognition (step 550) on the caller input.

The theoretical basis for such prosodic tests is illustrated schematically in FIG. 4a and FIG. 4b. Thus FIG. 4A shows in general terms the large-scale rise and fall of pitch during a spoken sentence, assuming of course that the sentence is being normally spoken, not sung. The | | markers indicate phrasal boundaries, effectively pauses in the spoken input (although these may not represent actual acoustic silence). Note that as shown, the final two groupings are spoken separately, rather than being run together as a complete phrase. The general movement within each phrase is for a rise-fall-rise, with the final rise being relatively long in duration. The final phrase group then has a different rise-fall pattern, with this time the final fall being relatively long in duration. Note the particular importance of duration here. Thus a final fall of short duration indicates that the speaker is going to continue; conversely a final rise with an excessively long duration implies that the speaker is in trouble.

Superimposed on the pitch pattern of FIG. 4a is a general pitch pattern, as shown in FIG. 4b (note the horizontal time axes of FIGS. 4a and 4b are aligned, although the vertical scale of FIG. 4b is somewhat exaggerated compared to that of FIG. 4a). This pitch pattern essentially represents an envelope which applies to the whole of the sentence, and shows a decrease in pitch excursion about a slowly decreasing mean (this effect is termed "declination").

Further details about intonation in terms of pitch profiles and declination can be found in: "Synthesising British English Intonation using Tonetic Stress Marks" by B Williams and P Alderson, in Proceedings of the Institute of Acoustics, Speech and Hearing v8, part 7, p417–424, 1986; and "Working with Speech", eds G Knowles, A Wichmann, and P Alderson, Longman, 1996 (see in particular Chapters 3 and 10).

Based on FIG. 4, one possible example of a prosodic indicator that the caller has finished speaking is a long decline in pitch value at the end of the input. This is a cue that the caller is now expecting the IVR to continue the dialogue. Another example where the IVR needs to consider interrupting the caller is where the pitch excursion resets itself to the initial value, instead of continuing with a steady decrease. This is an indication that the caller is in trouble, and that their input is losing coherence.

In terms of a practical implementation of such prosodic tests, the spoken pitch, in particular, the fundamental frequency, can be derived by any well-known method, for example using linear predictive coding (LPC), which is already supported in some voice processing systems. The variation of pitch with time can then be typically low pass filtered to conserve only the gross pitch movements, and also to allow for those periods where no pitch is available (i.e. unvoiced sounds, in particular certain consonants). The derived pitch can then be compared with the templates illustrated in FIG. 4 to locate any exceptions, or dialogue pitch cues.

As mentioned above, the preferred embodiment combines both prosodic information and semantic information in the test of step 560. One reason for this is that the prosodic information, although quickly available (it can be obtained in parallel with the speech recognition of step 550), is often only indicative rather than determinative of the caller situation. As an example, if the caller input semantically represents a question, and prosodically the caller terminates with a sustained rise (as opposed to the rise-fall pattern of FIG. 4a), then this is good confirmation that the caller has asked a question, and is now expecting something back from the IVR.

Considering now step 570, it will be appreciated that it is important that the action taken is sensitive to the caller's situation. Thus assuming that the next action as far as the caller is concerned is a further prompt, then simply to commence playing this out irrespective of what the caller is doing may simply lead to more confusion. Rather the system waits for an opportune moment to interrupt the caller input, such as a short pause (marked by audio silence), or an extended or repeated extralinguistic hesitation (for example "er . . . er"). It will be appreciated that in the former case the pause can be much shorter than the time-out period utilised in step 540, because of the extra information that the caller has completed his or her effective input. One advantage of operating this way is that it avoids any risk that the caller may feel obliged to restart if the IVR does not interrupt quickly enough.

It will be appreciated that there are many variations on the embodiment described herein. As one example, although the test of step 560 has been described as binary in nature, a more complicated procedure may be used. For example, this test may indicate that the caller is likely to have finished, but the system is not certain. In this case, the time-out period may be partially reduced, so that the machine will interrupt only if silence by the caller appears to confirm the situation, although this silence is less than the normal time-out period. It will also be appreciated that the prosodic properties discussed in detail relate primarily to English; other languages may have other prosodic factors that suggest completion of effective user input.

Furthermore, although the system of the present invention has been described primarily in terms of a telephony environment, it is not so limited. For example, it might be included in an automatic kiosk, or in an in-car navigation and control unit. It will therefore be recognised that the system of the present invention may find utility in a great variety of voice processing applications utilising speech recognition.

What is claimed is:

1. A method of operating a voice processing system comprising the steps of:

receiving spoken input from a user;

performing speech recognition to convert said spoken input into text equivalent;

analysing at least one semantic or prosodic property of said spoken input by looking for task words in the text equivalent of the spoken input; and responsive to said analysis, determining that the user input has effectively completed if there has not been a task word for more than a predetermined period of time.

2. The method of claim 1, wherein responsive to a determination that the user input has effectively completed, the system plays a prompt to the user.

3. The method of claim 2, wherein said prompt is played to the user when there is some break in the spoken input.

4. The method of claim 3, wherein said break is insufficient to trigger a general time-out for user input into the voice processing system.

5. The method of claim 1, wherein said step of analysing at least one semantic or prosodic property of said spoken input comprises looking for a prolonged pitch fall indicating effective completion of the spoken input.

6. The method of claim 1, wherein said step of analysing at least one semantic or prosodic property of said spoken input comprises looking for a reset of the pitch excursion envelope indicating effective completion of the spoken input.

7. The method of claim 1, wherein said step of analysing at least one semantic or prosodic property of said spoken input comprises looking for a question in the spoken input.

8. The method of claim 1, in which said voice processing system and said user communicate with each other over a telephone network, whereby said spoken input is received over a telephone connection.

9. A voice processing apparatus comprising:

an input device to receive spoken input from a user;

a speech recognition unit to convert said spoken input into text equivalent; and means for analysing at least one semantic or prosodic property of said spoken input by for looking for task words in the text equivalent of the spoken input; and wherein responsive to said analysis, it is determined that the user input has effectively completed if there has not been a task word for more than a predetermined period of time.

10. The apparatus of claim 9, wherein responsive to a determination that the user input has effectively completed, the apparatus plays a prompt to the user.

11. The apparatus of claim 10, wherein said prompt is played to the user when there is some break in the spoken input.

12. The apparatus of claim 11, wherein said break is insufficient to trigger a general time-out for user input into the voice processing apparatus.

13. The apparatus of claim 9, wherein said means for analysing at least one semantic or prosodic property of said spoken input comprises means for looking for a prolonged pitch fall indicating effective completion of the spoken input.

14. The apparatus of claim 9, wherein said means for analysing at least one semantic or prosodic property of said spoken input comprises means for looking for a reset of the pitch excursion envelope indicating effective completion of the spoken input.

15. The apparatus of claim 9, wherein said means for analysing at least one semantic or prosodic property of said spoken input comprises means for looking for a question in the spoken input.

16. The apparatus of claim 9, in which said voice processing apparatus and said user communicate with each other over a telephone network, whereby said spoken input is received over a telephone connection.

17. A computer readable medium containing instructions readable by a computer system operating as a voice processing system, said instructions including instructions for causing the computer system to perform the following steps:

receiving spoken input from a user;

performing speech recognition to convert said spoken input into text equivalent;

analysing at least one semantic or prosodic property of said spoken input by looking for task words in the text equivalent of the spoken input; and responsive to said analysis, determining that the user input has effectively completed if there has not been a task word for more than a predetermined period of time.

18. The medium of claim 17, wherein responsive to a determination that the user input has effectively completed, the system plays a prompt to the user.

19. The medium of claim 18, wherein said prompt is played to the user when there is some break in the spoken input.

20. The medium of claim 19, wherein said break is insufficient to trigger a general time-out for user input into the voice processing system.

21. The medium of claim 17, wherein said analysing at least one semantic or prosodic property of said spoken input comprises looking for a prolonged pitch fall indicating effective completion of the spoken input.

22. The medium of claim 17, wherein said analysing at least one semantic or prosodic property of said spoken input comprises looking for a reset of the pitch excursion envelope indicating effective completion of the spoken input.

23. The medium of claim 17, wherein said analysing at least one semantic or prosodic property of said spoken input comprises looking for a question in the spoken input.

24. The medium of claim 17, in which said voice processing system and said user communicate with each other over a telephone network, whereby said spoken input is received over a telephone connection.

* * * * *